March 21, 1967 P. S. BRYER 3,310,249

LOOP FAULT SENSING MEANS FOR WEB TRANSPORT SYSTEMS

Filed April 27, 1964 3 Sheets-Sheet 1

INVENTOR
PHILIP S. BRYER

BY Robert G. Clay

ATTORNEY

LOOP FAULT SENSING MEANS FOR WEB TRANSPORT SYSTEMS

Filed April 27, 1964 3 Sheets-Sheet 2

INVENTOR
PHILIP S. BRYER
BY Robert G. Clay
ATTORNEY

March 21, 1967 P. S. BRYER 3,310,249

LOOP FAULT SENSING MEANS FOR WEB TRANSPORT SYSTEMS

Filed April 27, 1964 3 Sheets-Sheet 3

INVENTOR
PHILIP S. BRYER
BY Robert G. Clay
ATTORNEY

United States Patent Office 3,310,249

Patented Mar. 21, 1967

3,310,249

LOOP FAULT SENSING MEANS FOR WEB TRANSPORT SYSTEMS

Philip S. Bryer, Los Angeles, Calif., assignor to Ampex Corporation, Redwood City, Calif., a corporation of California Filed Apr. 27, 1964, Ser. No. 362,787
12 Claims. (Cl. 242—55.12)

This invention relates to the pressure differential type of variable loop length device for web transports, and more particularly to vacuum chamber systems providing simple but reliable protection against tape damage in magnetic tape systems.

The pressure differential chamber, as used in magnetic tape transports, provides a means for establishing a variable length, relatively low tension, loop in the tape. Thus, such chambers are employed to mechanically isolate mechanisms having different acceleration and deceleration characteristics, such as capstans and reels. Pressure differential chambers therefore permit tapes to be handled gently but at high speeds, and acceleration or deceleration rates. In their usual form, these chambers have a depth which is only slightly greater than the width of the tape, so that a pressure differential across the tape maintains a loop within the chamber. The loop length is varied and controlled by the associated reel motor and tape drive mechanism. In most systems, the pressure differential is established by a vacuum source coupled through an outlet in one of the broad faces of the vacuum chamber near the closed end of the chamber. The other broad face of the chamber is usually transparent, in order that the action of the tape loop may be observed.

The present invention is described as it may be employed in a vacuum chamber system for a digital tape transport, but will be understood to apply to all forms of web transport systems using differential pressure columns to establish controlled length loops. The requirements for system performance, however, are perhaps greatest in digital magnetic tape transport, and therefore protection against tape damage is required to a greater degree in such systems.

Although it is intended that the tape loops within a vacuum chamber be maintained within certain length limits, conditions sometimes occur in which the loop length becomes excessively short or excessively long, relative to the chamber. For example, the drive mechanism may be operated without program restrictions in a rapid sequence which results in loss of a loop. Tape tension transients, tape irregularities, or power supply fluctuations can also result in the loop becoming excessively short or long. To guard against this eventuality, most vacuum chamber systems utilize separate long and short loop sensors which protect against damage by turning off the system in the event of excessive loop deviation. Short loops can permit the tape to be pulled taut and excessively stretched or broken in most systems. Long loops, on the other hand, can be drawn down into a vacuum outlet, with the tape being drawn into the outlet or the longitudinal edge of the tape being scraped or oscillated against the face of the outlet, and thereby damaging the tape.

The long and short loop safety sensing devices are usually in the form of pressure sensitive switches controlling associated circuits. The short loop sensing circuit is actuated whenever the short loop position sensor is exposed to the vacuum source directly, without an intervening tape loop, and the long loop sensing device is actuated whenever exposed to atmospheric pressure. The pressure sensitive switches used for these applications are expensive, and of course the more that are used the greater the amount of associated circuitry.

Further, vacuum chamber systems of this type do not protect the tape from damage when it is drawn against the outlet in the extremely long loop condition. It is desirable to be able to avoid this difficulty, but without affecting the flow of the vacuum system.

It is therefore an object of the present invention to provide an improved pressure differential chamber system for high performance web transport systems.

Another object of the present invention is to provide an improved vacuum chamber arrangement, having greater protection against tape damage than the prior art systems.

Pressure differential chamber systems in accordance with the invention are arranged to detect the occurrence of excessively short or long loops using a single pressure sensitive switch for each chamber, or for two chambers. A short loop sensing conduit is coupled through one wall of the chamber to atmosphere, and is maintained open, while a long loop sensing conduit is coupled to a pressure sensitive switch installation through the opposite broad wall of the chamber. The pressure sensitive switch is outside the principal conduit system for the chambers. In the event of either a short or a long loop condition, the pressure sensitive switch is coupled to atmosphere. Further, the long loop sensing conduit is positioned immediately adjacent and in a particular relation to a grill which is disposed transversely across the vacuum chamber and which blocks further extension of an extremely long loop without damaging the tape. The vacuum blower characteristics are arranged such that a suitable pressure drop is established at the pressure sensitive device for all possible loop fault conditions.

In alternative arrangements in accordance with the present invention, a single pressure sensitive switch may be disposed within the common pneumatic system for the two vacuum chambers of a tape transport. Any of the four possible excessive loop length variations may be detected by detection of pressure deviations within the pneumatic system.

A better understanding of the present invention may be had by reference to the following description, taken in conjunction with the accompanying drawings, in which.

Figure 1:
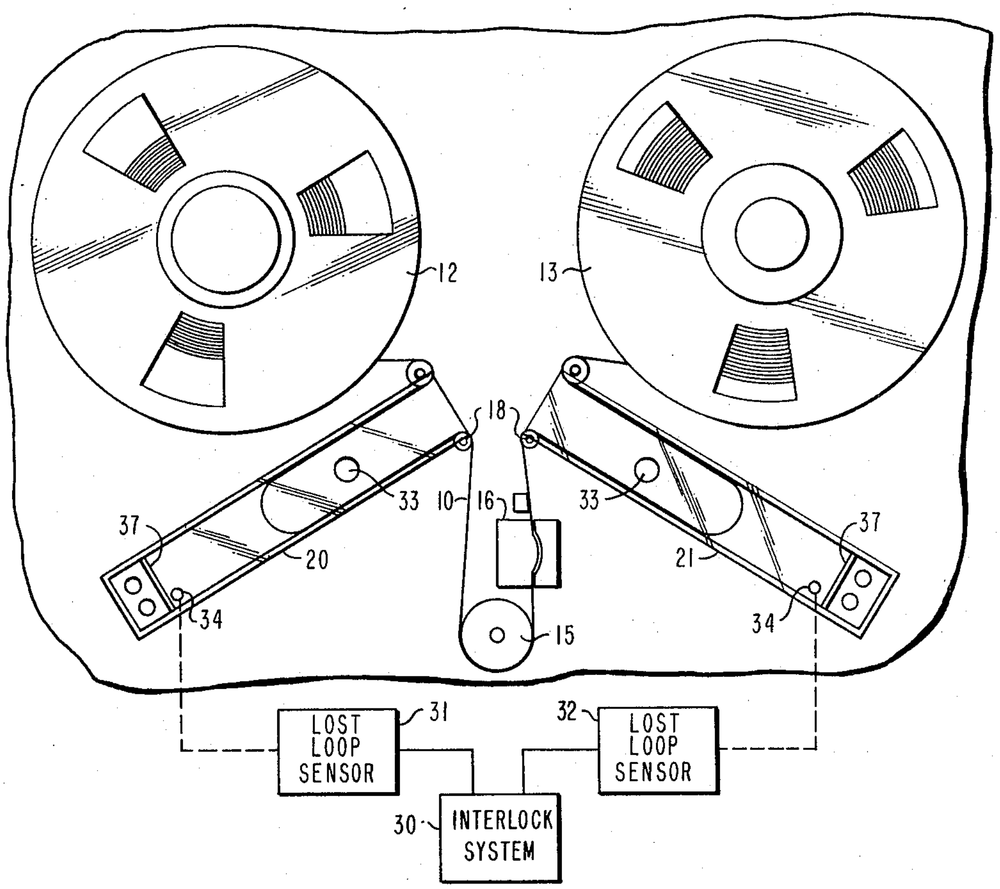
FIG. 1 is a simplified front view and block diagram of the principal element of a tape transport system including a tape loop protection system in accordance with the present invention.
Figure 3:
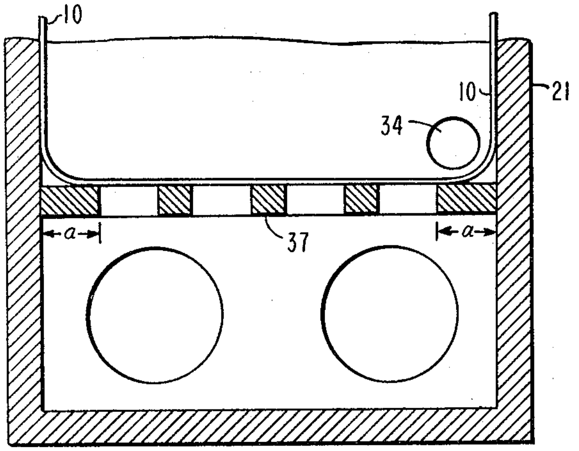
FIG. 3 is an enlarged fragmentary view of the portion of the vacuum chamber of FIG. 2, showing a tape in an excessively long loop position.
Figure 2:
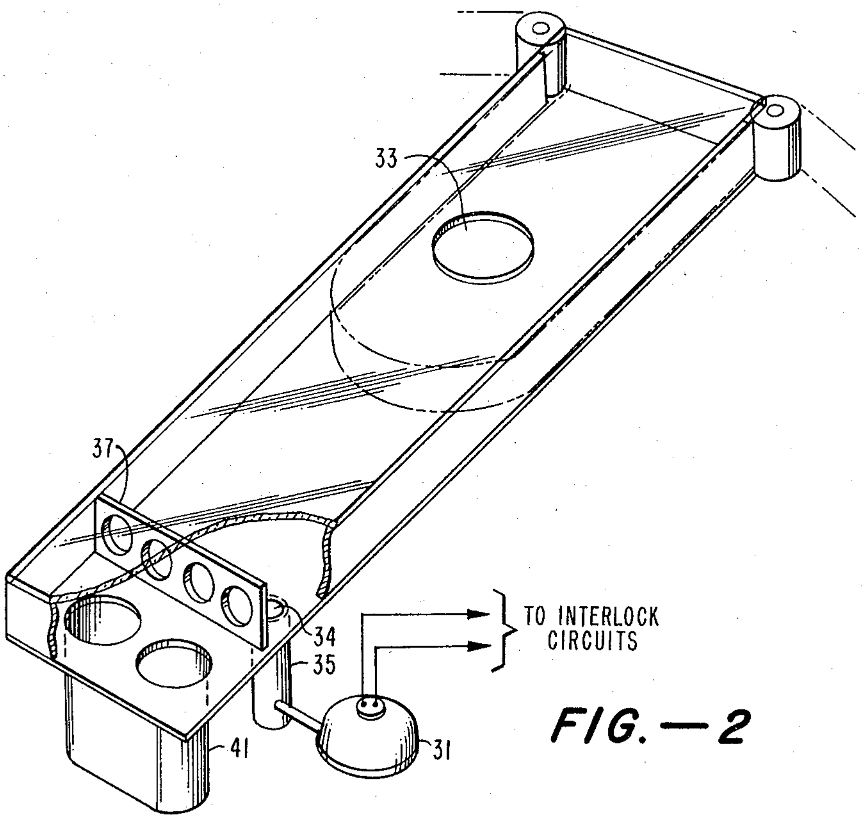
FIG. 2 is a perspective view, partially broken away, of the details of a vacuum chamber and loop fault sensor mechanism utilized in the arrangement of FIG. 1.

In the system of FIGS. 1 to 3, a magnetic tape 10, illustrative of a web member generally, is transported between a supply reel 12 and a takeup reel 13, being driven bi-directionally with extremely short start-stop times by a single capstan 15 driven by a high torque to inertia motor (not shown). Data for recording or reproduction is transferred by magnetic heads 16 coupled to recording and reproduction circuits (not shown). The tape 10 is kept within a confined path by guides 18 that additionally provide a high wraparound angle of the tape about the capstan, and that feed the tape into separate vacuum chambers, 20, 21, disposed between the different reels 12, 13 and the capstan 15. A pair of servo systems (not shown), each of which is associated with a vacuum chamber 20 or 21, sense the status of the tape in the chamber and control the associated reel 12 or 13 correspondingly. The servo systems, which may use loop position or tape velocity sensing, or a combination, may be conventional and therefore are not described in further detail. The servo systems operate to establish a control range within which the vacuum chambers 20, 21, normally maintain the loop lengths, and beyond which loop variations are not desired because of the danger of tape damage.

The excessive or "lost loop" fault condition is sensed, and used to activate an interlock system 30 which shuts off the motors for the reels 12, 13 and if necessary brakes all rotating elements of the system. Each vacuum chamber includes a single lost loop sensor 31, 32 respectively which provides an appropriate turn-off signal to the interlock system 30. Details of the lost loop sensor devices and the remainder of the tape protection arrangement are shown in the specific views of FIGS. 2 and 3.

As shown in FIGS. 2 and 3, the tape loop is formed by a pressure differential across the transverse dimension of the tape, and the depth or thickness of the chamber substantially corresponds to the width of the tape 10, so that there is little air leakage between the edges of the tape and the broad faces of the column or chamber. The tape protection system includes a short loop outlet 33 in the front broad wall of the chamber, and a long loop outlet 34 in the rear broad wall of the chamber. The short loop outlet 33 is a relatively large aperture, and is centered relative to the front broad wall, whereas the long loop outlet 34 is a relatively much smaller aperture, and is disposed adjacent one side wall of the chamber. The long loop outlet 34 is coupled directly through a conduit 35 to the pressure sensitive device for lost loop sensor 31, electrical connections from which are coupled to the interlock system 30 (FIG. 1). The long loop outlet 34 is disposed directly above a transverse grill 37 that provides a low impedance vacuum transfer orifice, and preferably comprises an aluminum member having a plurality of air transfer holes disposed normal to the surface of the grill 37.

The protection arrangement of FIGS. 1 to 3 operates by providing a single pneumatic path to atmosphere through both broad walls of the vacuum chamber to the sensor 31. By using outlets of different sizes, and in the opposite chamber walls, the pressure at the sensor 31 is raised toward atmosphere to an approximately equal extent whether the extremely long loop or extremely short loop condition exists.

The degree of vacuum at the chamber outlet is determined by the pressure established by a constant flow fan (not shown). The degree of vacuum is a maximum when flow is a minimum, and pressure drops off substantially linearly as flow increases, over a wide range. A relatively large long loop outlet 33 (of the order of 1″ in diameter for a 2½″ wide chamber for one practical system) is therefore required, in order to permit a sufficient flow increase for the pressure to decrease a reliably detectable amount at the pressure sensitive device 31. A small outlet would only slightly decrease the vacuum level (permit a pressure increase) if exposed to atmosphere by a short loop fault.

On the other hand, the long loop outlet 34 may be small, because it is coupled into a closed chamber containing the pressure sensitive device 31, which therefore responds directly to pressure variations arising from the long loop condition. Stated in another way, a long loop exposing the outlet 34 to atmosphere blocks off the pressure sensitive device 31 from the vacuum source, whereas a short loop does not.

The position of the long loop outlet 34 relative to the grill 37, and the arrangement of the grill 37 itself, further contribute to freedom from tape damage in the event of loss of control of the loop due to excessive length. The overly long loop comes into contact with the grill 37, in facing relationship, so that the loop is held against the grill, exposing the long loop outlet 34 to atmosphere. Prior to shutdown of the system, however, the loop is held against the grill 37 by a non-turbulent air flow, so that the loop is held against vibration and oscillation. The apertures are not sufficiently large to draw the tape through to any appreciable extent, and the tape is not damaged even if it is bound against the grill 37. FIG. 3 illustrates the manner in which a long loop may be held firmly against the grill 37, exposing the conduit 34 to atmosphere. It is preferred to arrange the apertures in the grill 37 in a particular manner relative to the long loop outlet 34. By placing the outlet 34 adjacent a side wall of the chamber, and close to the grill 37, the long loop fault condition is not sensed unless it clearly exists. If the bottom of a loop merely touches the grill 37 this is not sufficient for a fault to be sensed unless the loop continues to lengthen so as to expose the outlet 34. When this condition is attained the tape loop is held stationary and without vibration against the grill 37. Moreover, the apertures in the grill 37 are spaced from the side walls of the chamber by a predetermined amount (distance "*a*" in FIG. 3). Consequently, the tape maintains a substantial radius of curvature at the corners, and damage is further avoided.

Although the arrangement of FIGS. 1–3 is shown using two sensors 31, 32, it will also be appreciated that a single such device may be used, inasmuch as each is employed in an essentially closed chamber which is opened only to the vacuum chambers. A conduit (not shown) may couple the two long loop outlets 34 together, and a single sensor may be positioned intermediate the vacuum chambers, and preferably in a symmetrical manner relative to the two chambers. A given pressure drop at one outlet will cause a lesser drop at the sensor, but which can still be detected.

Figure 5:
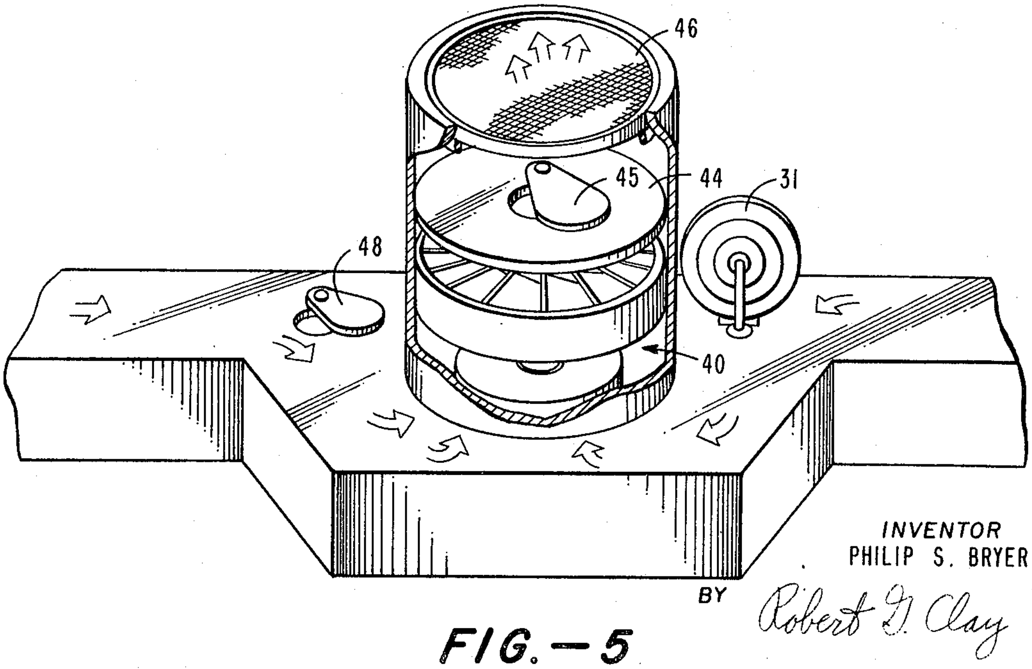
FIG. 5 is an enlarged fragmentary perspective view, partially broken away, of a portion of the arrangement of FIG. 4.
Figure 4:
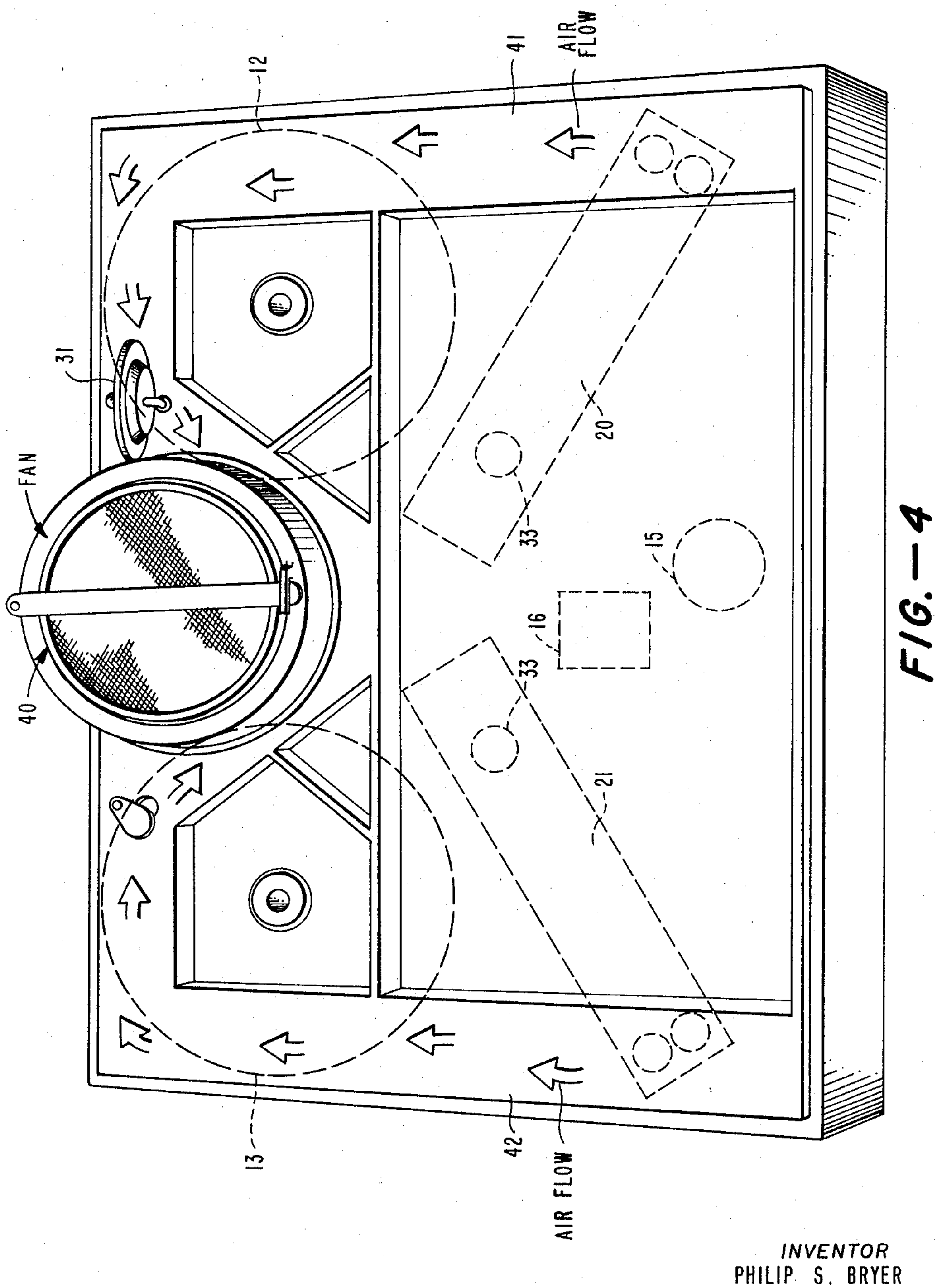
FIG. 4 is a back view of an alternate tape protection system for a vacuum chamber mechanism in accordance with the invention.

In a different arrangement as shown in FIGS. 4 and 5, a single pressure sensitive device may be utilized in the vacuum or pneumatic system itself and for different modes of system operation.

In FIGS. 4 and 5, parts corresponding to those of FIGS. 1 to 3 are similarly designated. A centrifugal constant flow fan 40 is symmetrically coupled by conduits 41, 42 to the vacuum outlets of each chamber, 20, 21, to provide the vacuum source. Air is forced out a baffle plate 44 having an adjustable orifice 45, and through a filter 46. An adjustable bleed hole 48 is positioned in the conduit 41 at a point adjacent the fan 40.

In this arrangement, the grill 37 is not employed, nor is the long loop outlet 34 employed. Instead, the single pressure sensitive device 31 is positioned in the common coupling from the fan 40 to the conduits 41, 42. The pneumatic impedance presented by the vacuum chambers 20, 21 and conduits 41, 42 to the fan 40 remains substantially high, as long as the loops remain within the normal control range in the chambers 20, 21. Note that the "constant flow" of the fan refers to the unchanged flow level in operation, and does not connote that the fan has equal flow at varying pressures. Thus, the pressure at the pressure sensitive device 31 remains near the level of the vacuum source. When a loop is lost, either by becoming so short that it exposes a short loop outlet 33 directly to the vacuum outlet in the chamber, or so long that it exposes a part of the vacuum outlet itself, the pneumatic impedance suddenly becomes very low. Consequently, the fan 40 does not maintain a comparable vacuum level, and the pressure sensitive device 31 is actuated.

The pressure vs. flow characteristic for the fan 40 may be modified by adjustment of the bleed hole 48 in the conduit, to control the vacuum level, and by adjustment of the orifice 45 in the baffle plate 44 to control the slope of the characteristic curve. By the use of these two variables, it is feasible to modify the characteristics of the pneumatic system to operate in two or a variety of modes. For example, it is often useful to apply a higher voltage to the motor when the tape velocity is materially increased above normal velocity, as during operation in a rewind mode. The slopes of the fan characteristics for the two operating speeds are set such that there is sufficient pressure differential for reliable sensing of the lost loop condition in either mode.

In the system of FIGS. 4 and 5 the sensor responds to fluctuations in the pressure of the main vacuum system. Consequently, the grill 37 is not employed because the long loop condition results in a deviation away from atmospheric pressure when the grill is present. Where this system is used, the vacuum outlet in the chamber may be so configured as to limit tape oscillation. Thus, an upwardly extending channel of varying depth may provide a variable bypass to atmosphere in the region of the vacuum outlet.

While there have been described above and illustrated in the drawings various forms of tape protection arrangements for pressure differential chamber systems, it will be appreciated that the invention is not limited thereto. Accordingly, the invention should be considered to include all alterations, modifications and variations falling within the scope of the appended claims.

What is claimed is:

1. In a digital magnetic tape transport having a pair of vacuum chambers for forming variable length loops in a tape, a tape protection system for preventing tape damage in the event of excessively short or excessively long loops within the chamber, and comprising: means defining vacuum outlets in each of the vacuum chambers; fan means for providing a substantial vacuum, said fan means having a pressure characteristic which decreases as flow increases; conduit means coupling each of the vacuum outlet means from the two chambers to the fan means; means defining a short loop aperture in each of the vacuum chambers; means defining a long loop aperture in each of the vacuum chambers, the short loop apertures being adequately large to substantially increase the flow provided by the fan means over the normal flow, and open to atmosphere; pressure sensitive means coupled to the long loop apertures; and interlock means responsive to the pressure sensitive means for shutting off operation of the tape transport system.

2. A system for sensing long and short loop fault conditions in the vacuum chamber of a web transport comprising a rectangular cross section vacuum chamber having an open end and a substantially closed end, the side dimensions substantially corresponding to the web width dimensions, such that a web may be drawn to variable loop lengths within the chamber with relatively low leakage between the edges of the web and the broad walls of the chamber, means defining a vacuum outlet at a region adjacent the closed end of the chamber in a first of the broad walls thereof, means defining a short loop outlet to atmosphere in one broad wall of the chamber at a selected lengthwise position therein, means defining a long loop outlet to atmosphere at a second selected lengthwise position in a broad wall of the vacuum chamber above the vacuum outlet, the short loop outlet being substantially larger in size than the long loop outlet, means coupled to the vacuum outlet for establishing a substantial pressure differential across the web loop in the chamber, said means having a flow vs. pressure characteristic in which flow increases as pressure decreases, and a single pressure sensitive means coupled to the long loop outlet for sensing pressure deviations thereat whenever the loop rises above the short loop outlet or falls below the long loop outlet.

3. An improved vacuum chamber for digital magnetic tape transports comprising: a column having an open end for receiving tape and a substantially closed end, and narrow side dimensions substantially corresponding to the transverse dimensions of the tape, means adjacent the closed end and coupled to one broad face of the column for establishing an air pressure differential across the tape in the column, means defining a long loop sensing hole in one broad face of the column at a selected position along the column above the air pressure differential means, means defining a short loop sensing hole in the other broad face of the column at a selected position along the column, said short loop sensing hole means being coupled to atmosphere, and a single pressure sensing means coupled to the long loop sensing hole means, for sensing substantial increases in pressure at the long loop sensing hole whenever the loop rises above the short loop sensing hole means or falls below the long loop sensing hole means.

4. The invention as set forth in claim number 3 above, wherein the means defining a long loop sensing hole includes a relatively small aperture adjacent one side wall of the column, and wherein the means defining a short loop sensing hole provides a relatively larger aperture disposed centrally relative to the column.

5. The invention as set forth in claim number 3 above, and including in addition a perforated grill member disposed immediately adjacent the means defining a long loop sensing hole, and on the side adjacent the closed end of the column, the grill including a plurality of apertures, and the edges of the apertures closest the side walls of the column being spaced apart by a selected distance from said side walls.

6. In a chamber system for establishing tape loops, a protection arrangement for preventing tape damage including the combination of lost loop sensing means including a single pressure sensitive switch, means defining a relatively large short loop sensing aperture open to atmosphere at one lengthwise position along the chamber, means defining a relatively small long loop sensing aperture at another lengthwise position along the chamber, and means coupled to the chamber for providing a pressure differential across the tape loop, the long loop sensing aperture means being above the pressure differential means and the pressure sensitive switch being coupled to the long loop sensing aperture for sensing pressure deviations thereat whenever the loop rises above the short loop sensing aperture or falls below the long loop sensing aperture.

7. The invention as set forth in claim number 6 above, wherein the means for providing a pressure differential has a substantial pressure variation when coupled to atmosphere through the short loop sensing aperture, and including in addition a transverse grill disposed adjacent the long loop sensing aperture.

8. In a vacuum chamber system having a pair of similar chambers, a tape protection arrangement for preventing damage to a tape including the combination of vacuum outlet means disposed adjacent the closed end of each chamber, means defining a short loop sensing aperture at a selected position in a wall of each chamber, said aperture opening the interior of the chamber to atmosphere at the selected position, conduit means coupling the vacuum outlet means of each chamber to a common conduit region, fan means coupled to the common conduit region for normally maintaining a selected vacuum level therein, and a single pressure sensitive means coupled to both chambers in the region of the vacuum outlet means for sensing increases in pressure therein above a selected level whenever the loop rises above the short loop sensing aperture.

9. The invention as set forth in claim number 8 above, including in addition means defining a long loop sensing aperture in a wall of the chamber, and wherein the pressure sensitive means is coupled to said long loop sensing aperture.

10. The invention as set forth in claim number 8 above, wherein the pressure sensitive means is positioned in the common conduit region.

11. In a digital magnetic tape transport having a pair of vacuum chambers for forming variable length loops in a tape, a tape protection system for preventing tape damage in the event of excessively short or excessively long loops within the chamber, and comprising: means defining vacuum outlets in selected broad walls of each of the vacuum chambers; fan means providing a substantial vacuum level; symmetrically disposed conduit means coupling each of the vacuum outlet means from the two chambers to the fan means, air baffle means coupled to the fan means; means defining a pair of short loop sensing apertures in each of the vacuum chambers, each of the said means being coupled through a broad wall of the vacuum chamber at a short loop position therein; a single pressure sensitive switch mounted in the conduit means in the region of the fan means, for sensing changes in the vacuum level thereat and interlock means responsive to the pressure sensitive switch for shutting off operation of the tape transport.

12. A system for sensing long and short loop fault conditions in the vacuum chamber of a magnetic tape transport comprising a rectangular cross-section vacuum chamber, the side dimensions substantially corresponding to the tape dimensions, such that a tape may be drawn to variable loop lengths within the chamber with relatively low leakage between the edges of the tape and the broad walls of the chamber, means defining a vacuum outlet at a region adjacent the closed end of the chamber in one of the broad walls thereof, means providing a vacuum source coupled to the vacuum outlet, means defining a short loop sensing aperture in one of the broad walls of the chamber at a selected lengthwise position therein, means defining a long loop sensing aperture in a broad wall of the chamber at a second selected lengthwise position therein above the vacuum outlet, the short loop sensing aperture communicating with atmosphere and being sufficiently large to substantially decrease the vacuum established by the means providing a vacuum source, and a single pressure sensitive means in the path of flow from the vacuum outlet means for detecting either the short loop or the long loop fault condition by variations in the vacuum level thereat whenever the loop rises above the short loop sensing aperture means or falls below the long loop sensing aperture means.

References Cited by the Examiner

UNITED STATES PATENTS

| | | | |
|---|---|---|---|
| 2,921,753 | 1/1960 | Lahti et al. | 242—55.12 |
| 2,927,789 | 3/1960 | Walsh et al. | 226—97 X |
| 3,074,661 | 1/1963 | Brumbaugh | 242—55.12 |
| 3,112,473 | 11/1963 | Wicklund et al. | 340—174.1 |

FOREIGN PATENTS

| | | |
|---|---|---|
| 872,441 | 7/1961 | Great Britain. |

FRANK J. COHEN, *Primary Examiner.*

G. F. MAUTZ, *Examiner.*